United States Patent
Lin

(10) Patent No.: US 11,025,684 B2
(45) Date of Patent: Jun. 1, 2021

(54) USER ELECTRONIC DEVICE AND NON-TRANSITORY COMPUTER READABLE MEDIUM FOR REAL-TIME INTERACTION BETWEEN USER AND DEVICE

(71) Applicants: ThroughTek Technology (ShenZhen) Co., Ltd., Shenzhen (CN); ThroughTek Co., Ltd., Taipei (TW)

(72) Inventor: Yi-Ying Lin, Taipei (TW)

(73) Assignees: Throughtek Technology (Shenzhen) Co., Ltd., Shenzhen (CN); Throughtek Co., Ltd., Taipei (TW)

( * ) Notice: Subject to any disclaimer, the term of this patent is extended or adjusted under 35 U.S.C. 154(b) by 593 days.

(21) Appl. No.: 15/156,722

(22) Filed: May 17, 2016

(65) Prior Publication Data
US 2017/0223070 A1    Aug. 3, 2017

(30) Foreign Application Priority Data

Jan. 29, 2016    (TW) .............................. 105102972 A

(51) Int. Cl.
| | |
|---|---|
| *H04L 29/06* | (2006.01) |
| *H04L 12/58* | (2006.01) |
| *G06F 3/0482* | (2013.01) |
| *G06F 3/0484* | (2013.01) |
| *H04L 29/08* | (2006.01) |

(52) U.S. Cl.
CPC .......... *H04L 65/403* (2013.01); *G06F 3/0482* (2013.01); *G06F 3/0484* (2013.01); *H04L 51/046* (2013.01); *H04L 51/18* (2013.01); *H04L 51/36* (2013.01); *H04L 65/4092* (2013.01); *H04L 65/60* (2013.01); *H04L 67/104* (2013.01); *H04L 67/125* (2013.01)

(58) Field of Classification Search
CPC ............... H04L 65/403; H04L 65/1059; H04L 65/4092; H04L 67/125; H04L 65/60; H04L 51/36; H04L 67/104; G06F 3/0484; G06F 3/0482

See application file for complete search history.

(56) References Cited

U.S. PATENT DOCUMENTS

| | | | |
|---|---|---|---|
| 2008/0172463 A1* | 7/2008 | Qin ..................... | H04L 12/1822 709/204 |
| 2008/0313356 A1* | 12/2008 | Blinn ..................... | H04L 51/04 710/7 |
| 2012/0281095 A1* | 11/2012 | Trenciansky .......... | G06Q 10/00 348/159 |

(Continued)

*Primary Examiner* — Roberto Borja
(74) *Attorney, Agent, or Firm* — Muncy, Geissler, Olds & Lowe, P.C.

(57) ABSTRACT

A user electronic device includes a storage unit, a processing unit, a networking unit and a screen. The screen displays a chat room interface for interacting with a group. The chat room interface has a first window, a function bar and a second window. The first window displays operating information of a device identity of the group. The second window displays chat content. The function bar has a chat function bar and a device instruction bar. The chat function bar is used for inputting the chat content. The device instruction bar is used for providing a control key set corresponding to the device identity, and the control key set is used for generating one or more control signal.

11 Claims, 8 Drawing Sheets

(56) References Cited

U.S. PATENT DOCUMENTS

| | | | | |
|---|---|---|---|---|
| 2014/0333713 A1* | 11/2014 | Shoemake | ............ | H04L 65/1069 348/14.05 |
| 2015/0022666 A1* | 1/2015 | Kay | ............... | H04L 67/025 348/159 |
| 2015/0067080 A1* | 3/2015 | Cho | ............... | H04W 4/12 709/206 |
| 2015/0264731 A1* | 9/2015 | Lin | ............... | H04M 1/72522 455/41.2 |
| 2015/0281166 A1* | 10/2015 | Woo | ............... | H04L 51/02 709/206 |
| 2016/0105644 A1* | 4/2016 | Smith | ............... | H04N 5/23206 348/159 |
| 2016/0187862 A1* | 6/2016 | Nayak | ............... | H04N 21/41407 700/275 |
| 2016/0373388 A1* | 12/2016 | Katis | ............... | H04L 51/10 |

* cited by examiner

US 11,025,684 B2

USER ELECTRONIC DEVICE AND NON-TRANSITORY COMPUTER READABLE MEDIUM FOR REAL-TIME INTERACTION BETWEEN USER AND DEVICE

CROSS-REFERENCES TO RELATED APPLICATIONS

This non-provisional application claims priority under 35 U.S.C. § 119(a) on Patent Application No. 105102972 filed in Taiwan, R.O.C. on 2016 Jan. 29, the entire contents of which are hereby incorporated by reference.

BACKGROUND

Technical Field

The instant disclosure relates to a network communication system, and in particular relates to a user electronic device, a user interface and a computer program product.

Related Art

With advances in technology, Internet of Things (IoT) and cloud computing has been widely used in smart home facilities, mobile terminal devices, and industrial systems etc. In the Internet era, people can communicate with each other through the Internet, people can obtain device information through the Internet, and IoT further creates a network environment for communication between a device and another device. With a webcam device, for example, a user can perform remote monitoring operations, such as conducting a live video conference at a remote site via the Internet, watching a child's activity status instantly, or home security surveillance.

However, IoT can only provide one-way communication between people and a device. A user can control the device by way of Internet of Things, but cannot interact with other users at the same time.

SUMMARY

In an embodiment, a user electronic device includes a storage unit, a processing unit, a networking unit and a screen. The processing unit is coupled to the storage unit, the networking unit, and the screen. The storage unit stores a plurality of contacts. The contacts include at least one device identity and a plurality of user identities. The processing unit activates a chat room interface of a group. A device identity and at least a user identity are assigned to the group. The networking unit is connected to a remote-controlled electronic device and at least one other user electronic device. Herein, the remote-controlled electronic device belongs to the device identity of the group, while the other user electronic device belongs to the user identity of the group, respectively. The screen displays the chat room interface.

The chat room interface includes a first window, a function bar, and a second window. The first window displays operating information of the remote-controlled electronic device represented by the device identity of the group. The second window displays at least one chat content. The function bar includes a chat function bar and a device instruction bar. The chat function bar is used for inputting the chat content, and the device instruction bar is used for providing a control key set corresponding to the device identity of the group. This control key set is used for generating at least one control signal to control the remote-controlled electronic device.

In an embodiment, a user interface is used for providing a first user electronic device with a capability of interacting with any of at least one group as a first user identity. Therein, each group includes a device identity and at least one second user identity. The user interface includes a first window, a function bar, and a second window. The first window displays operating information of a remote-controlled electronic device represented by the device identity of the group interacting with the first user electronic device. The second window displays at least one chat content. The chat content is from one of the first user electronic device, the remote-controlled electronic device represented by the device identity of the group interacting with the first user electronic device, and the second user electronic device represented by the second user identity of the group interacting with the first user electronic device. The function bar includes a chat function bat and a device instruction bar. The chat function bar is used for generating the chat content of the first user electronic device. The device instruction bar is used for providing a control key set corresponding to the device identity of the group interacting with the first user electronic device. The control key set is used for generating at least one control signal to control the remote-controlled electronic device represented by the device identity of the group interacting with the first user electronic device In an embodiment, a computer program product includes a plurality of computer program instructions stored in a computer readable medium. The computer program instructions are loaded and executed by a first user electronic device to cause the first user electronic device to implement the user interface of any embodiment.

As above, a user electronic device, a user interface, and a computer program product according to any embodiment can provide a chat room interface for real-time interaction between people and device.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
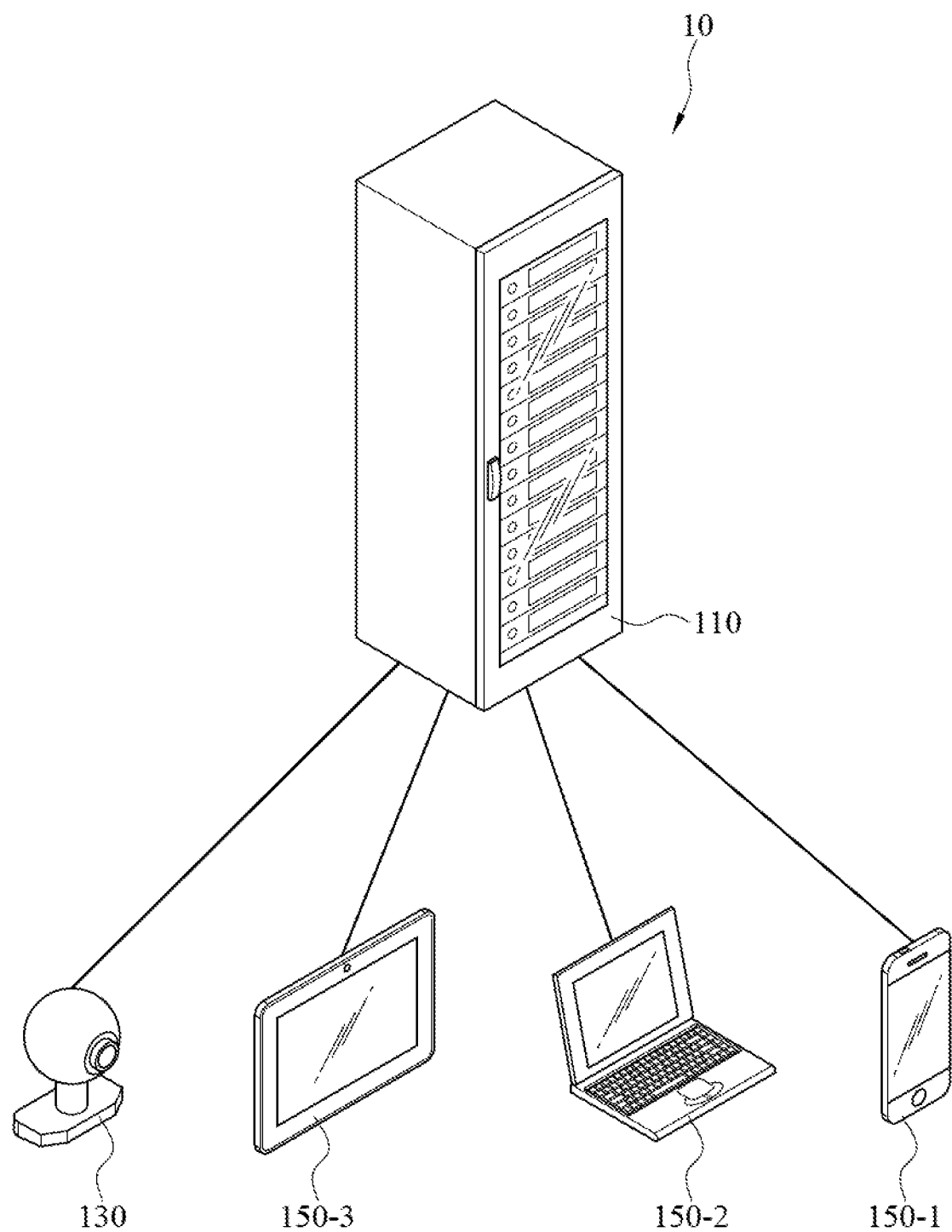
FIG. 1 is a schematic diagram of an embodiment of an association communication system.
Figure 2:
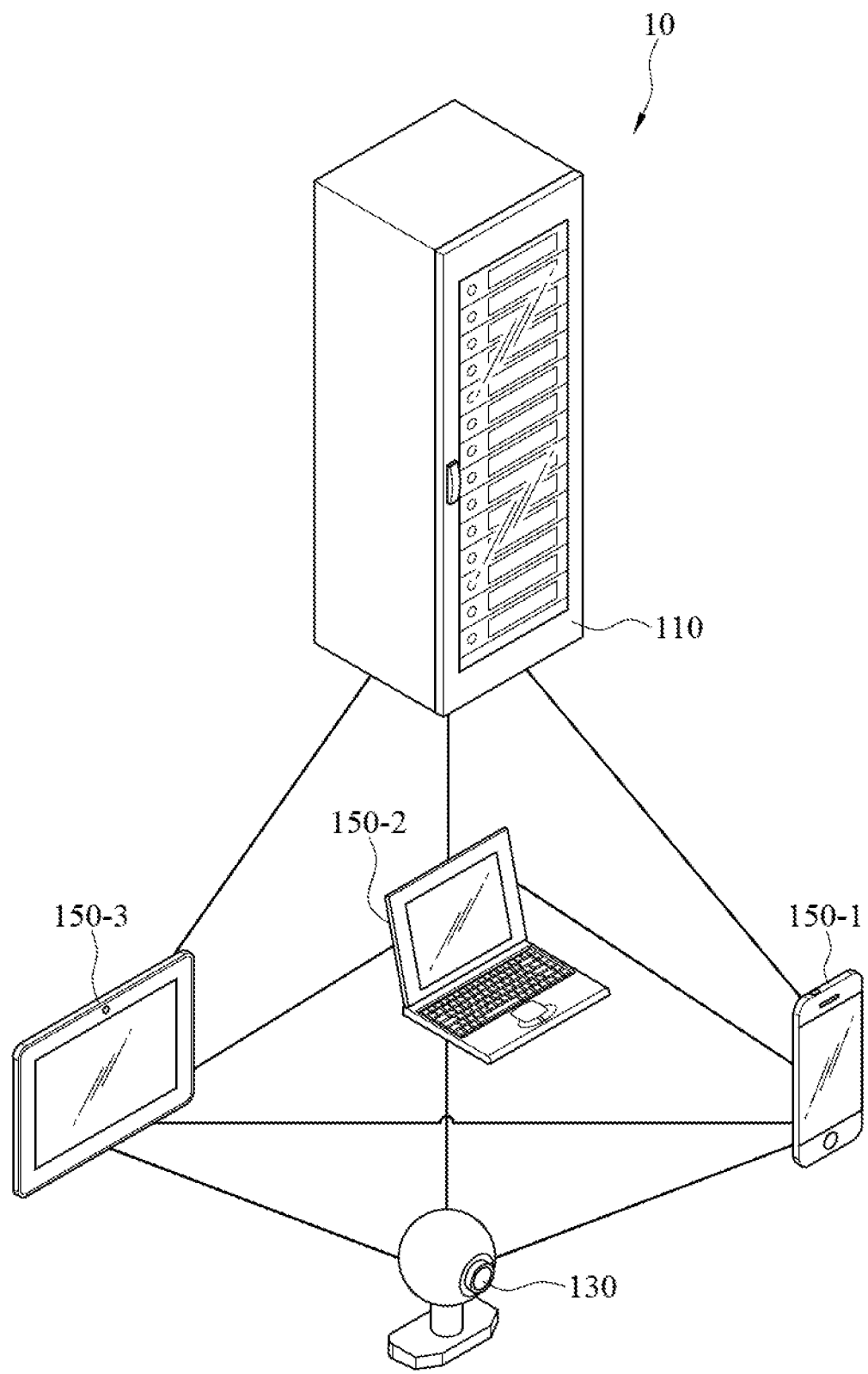
FIG. 2 is a schematic diagram of another embodiment of the association communication system.

FIG. 1 is a schematic diagram of an embodiment of an association communication system with a remote-controlled electronic device. FIG. 2 is a schematic diagram of another embodiment of the association communication system with the remote-controlled electronic device.

With reference to FIG. 1 and FIG. 2, an association communication system 10 includes a server 110, a remote-controlled electronic device 130, and a plurality of user electronic devices 150-1, 150-2, and 150-3.

In some embodiments, the remote-controlled electronic device 130 and the user electronic devices 150-1, 150-2, and 150-3 are connected to one another via the server 110. In some embodiments, the relayed-connection to one another among the remote-controlled electronic device 130 and the user electronic devices 150-1, 150-2, and 150-3 is established via the server 110, as shown in FIG. 1. In some other embodiments, the point-to-point connections between the remote-controlled electronic device 130 and the user electronic devices 150-1, 150-2, and 150-3 are established with the aid of the server 110, and then the remote-controlled electronic device 130 and the user electronic devices 150-1, 150-2, and 150-3 are in point-to-point connections to one another, as shown in FIG. 2. In some yet other embodiments, the relayed-connection via the server 110 and the point-to-point connection simultaneously exist in the connection network between the remote-controlled electronic device 130 and user electronic devices 150-1, 150-2, and 150-3 (not shown). For example, the user electronic device 150-1 is relayed-connected to the remote-controlled electronic device 130 via the server 110 and is point-to-point connected to the user electronic device 150-2. Or, the user electronic device 150-1 is relayed-connected to the user electronic device 150-2 via the server 110 and is point-to-point connected to the remote-controlled electronic device 130.

Figure 3:
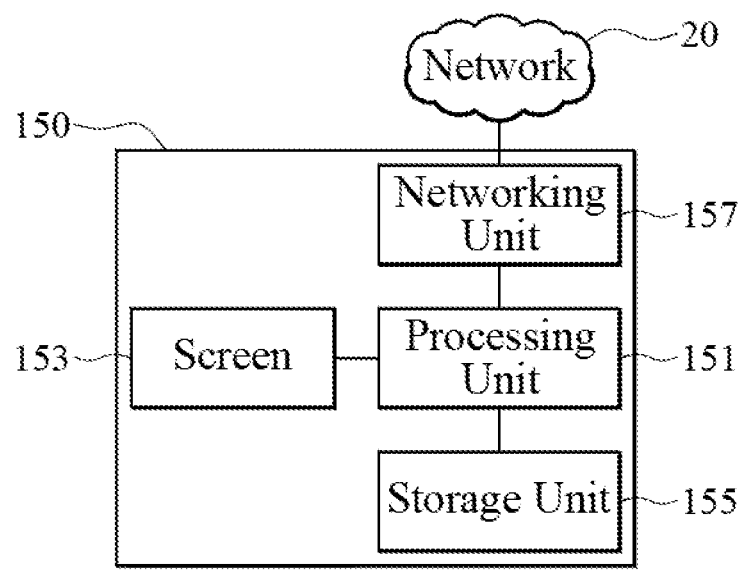
FIG. 3 is a functional block diagram of an embodiment of a user electronic device shown in FIG. 1 or FIG. 2.

FIG. 3 is a functional block diagram of an embodiment of the user electronic device shown in FIG. 1 and FIG. 2.

In some embodiments, with reference to FIGS. 1 to 3, each of the user electronic devices 150 (e.g. any of 150-1, 150-2, and 150-3) includes a processing unit 151, a screen 153, a storage unit 155, and a networking unit 157. The processing unit 151 connects the screen 153, the storage unit 155 and the networking unit 157. The user electronic device 150 is connected to the server 110, the other user electronic devices 150 (e.g. the others of 150-1, 150-2, and 150-3) and/or the remote-controlled electronic device 130 by the networking unit 157 through a network 20, so that the processing unit 151 can communicate with the server 110, the other user electronic devices 150 (e.g. the others of 150-1, 150-2, and 150-3) and/or the remote-controlled electronic device 130. In some embodiments, the networking unit 157 can use different types of networking technology, such as mobile network technology, wireless network technology, and Bluetooth technology etc., to link and communicate with the other user electronic devices 150 (e.g. the others of 150-1, 150-2, and 150-3) and/or the remote-controlled electronic device 130.

In some embodiments, the processing unit 151 of each user electronic device 150 can implement a user interface by executing firmware or software algorithms and with such user interface as a first user identity, interact with any of at least one group. Herein, the firmware or software algorithms can be implemented by computer program instructions. In some embodiments, the computer program instructions can be stored in a computer program product. As such, the computer program product can be a computer readable medium to be loaded by the user electronic device 150 to execute. In some embodiments, the computer program instructions above can be a computer program product, and can be transmitted to the user electronic device 150 in a wired or wireless way.

With the user electronic device 150-1 (hereinafter referred to as "a first user electronic device 150-1") as an example, the computer program instructions can be an association communication program. The processing unit 151 of the first user electronic device 150-1 stores the association communication program in the storage unit 155 by executing an installation procedure of the association communication program, and displays an icon of the association communication program on the screen 153. When the icon of the association communication program is selected/enabled, the processing unit 151 executes the association communication program in response to an enabling signal representing the icon is selected/enabled.

In some embodiments, the association communication program relates to a set of an account (i.e. identification code of the user) and a password. In other words, the processing unit 151 of the first user electronic device 150-1 executes the association communication program for the first time so that the networking unit 157 can connect to the server 110 via the network 20. And then the processing unit 151 transmits an account (hereinafter referred to as a first identification code) and a password via the networking unit 157 and the network 20 to the server 110 for logon authentication. Upon completion of logon authentication, the server 110 can establish access blocks for various types of information (e.g. password, link information, association information etc., as shown in Table 1 and Table 2) related to the first identification code, and store various types of generated information for the first identification code in those blocks so that when the first user electronic device 150-1 connects to the server 110 once again using the first identification code (executing the association communication program the next time), the first electronic device 150-1 can access the various types of information of the first identification code via the network 20.

TABLE 1

The information related to a device identity D1
Device identity D1

| Contacts | Identification code | Link information | Authority |
| --- | --- | --- | --- |
| User identity P1 | account | Internet Protocol (IP) address | second level |
| User identity P2 | account | IP address | first level |
| User identity P3 | account | IP address | second level |

TABLE 2

The information related to a user identity P1
User identity P1

| Contacts | Identification code | Link information | Authority |
| --- | --- | --- | --- |
| Device identity D1 | device identification (UID) | IP address | second level |
| Device identity D2 | UID | IP address | first level |
| Device identity D3 | UID | IP address | second level |

In some embodiments, the association information includes a contacts list and a groups list. The contacts list records at least one contact and the groups list records at least one group. In other embodiments, the "group" information in the groups list can be recorded in the contacts list by way of group setting; in other words, the contacts list records at least one contact and a group setting, representing the group which the contacts are assigned to or belong to.

In some embodiments, when the server 110 has established the access blocks for various types of information for the first identification code, the first user electronic device 150-1 connects and logons to the serer 110 again using the first identification code, the processing unit 151 of the first user electronic device 150-1 can access the association information of the first identification code from the corresponding storage unit of the server 110, and load the accessed association information to the storage unit 155 of the first user electronic device 150-1.

In some embodiments, whenever to be offline (the connection with the server 110 is cut off), the processing unit 151 of the first user electronic device 150-1 uploads the currently-stored association information of the first identification code to the server 110 and updates the association information of the first identification code stored in the server 110.

In other embodiments, if the association information stored in the a first user electronic device 150-1 is changed, the processing unit 151 of the first user electronic device 150-1 would upload the currently-stored association information of the first identification code to the server 110 and update the association information (i.e., the changed association information) of the first identification code stored in the server 110.

In some embodiments, whenever connection is established, the processing unit 151 of the first user electronic device 150-1 uploads the currently-stored association information of the first identification code to the server 110. And the server 110 will determine which is newer between the time status of the received association information and the time status of the association information of the first identification code stored in the server 110. If the time status of the received association information is newer, the server 110 will update the stored association information of the first identification code with the received association information. If the time status of the stored association information is newer, the server 110 will send the stored association information of the first identification code back to the first user electronic device 150-1 for the processing unit 151 to update the association information of the first identification code which is stored in the storage unit 155.

In some embodiments, if no association information of a first identification code exists or is stored in a first user electronic device 150-1 used by a user, the processing unit 151 of the first user electronic device 150-1 will access the association information of the first identification code in the server 110 and store it in the storage unit 155 of the first user electronic device 150-1.

If the association information of the first identification code exists or is stored in a first user electronic device 150 (i.e., exists in the storage unit 155 of the first user electronic device 150) used by a user, a processing unit 151 of the first user electronic device 150-1 will access the association information of the first identification code in the server 110 and update the association information of the first identification code in the storage unit 155 with the association information accessed from the server 110.

In some embodiments, confirmation of the time status can also be executed by the processing unit 151. Whenever connection is established, the processing unit 151 of the first user electronic device 150-1 will access the association information of the first identification code from the server 110, and will then determine which is newer between the time status of the received association information and the time status of the association information of the first identification code stored in the storage unit 155. If the time status of the received association information is newer, the processing unit 151 will update the stored association information of the first identification code with the received association information. If the time status of the stored association information is newer, the processing unit 151 will upload the stored association information of the first identification code to the server 110 to update the association information of the first identification code which is stored in the server 110.

In some embodiments, a contact can be a user identity or a device identity.

In some embodiments, each contact has an identification code, for example: a device identification code, a mobile number or an account. Preferably, the identification code of a device identity can be a device identification code or an account; the identification code of a user identity can be a mobile number or an account.

For example, if a contact is a device identity, an identification code of the device identity can be a unique identification code (UID) of the device. In other words, a user (i.e., a user identity) can add the unique identification code (as the contact, representative of the remote-controlled electronic device 130) of a remote-controlled electronic device 130 to a contacts list of the first identification code. In some embodiments, a device identification code can be shown in the form of a barcode. Herein, the barcode with the information, which has the device identification code, etc., can be one-dimensional or two-dimensional. A two-dimensional barcode can be, for example: a PDF417 barcode, a Quick Response Code (QR Code) barcode, a composite barcode, and a Data Matrix code etc. In some embodiments, the barcode with the information, which has the device identification code, etc., can be located on the body of a remote-controlled electronic device 130, or can be found in the specification (in paper or electronic files) of the remote-controlled electronic device 130 or in the manual (in paper or electronic files) of the remote-controlled electronic device 130.

If a contact is a user identity, an identification code of the user identity can be established by way of an account. In other words, a user (i.e., a user identity) can perform connection and logon to the server 110 from any first user electronic device 150-1 via the user-specific account (i.e., the identification code) and the password to access contacts and groups of the first identification code in the server 110. Furthermore, the user (i.e., the user identity) can add identification codes of other user electronic devices 150-2 and 150-3 (hereinafter referred to as the contacts, representative of the second user electronic devices 150-2 and 150-3) to a contacts list of the first identification code.

Figure 4:
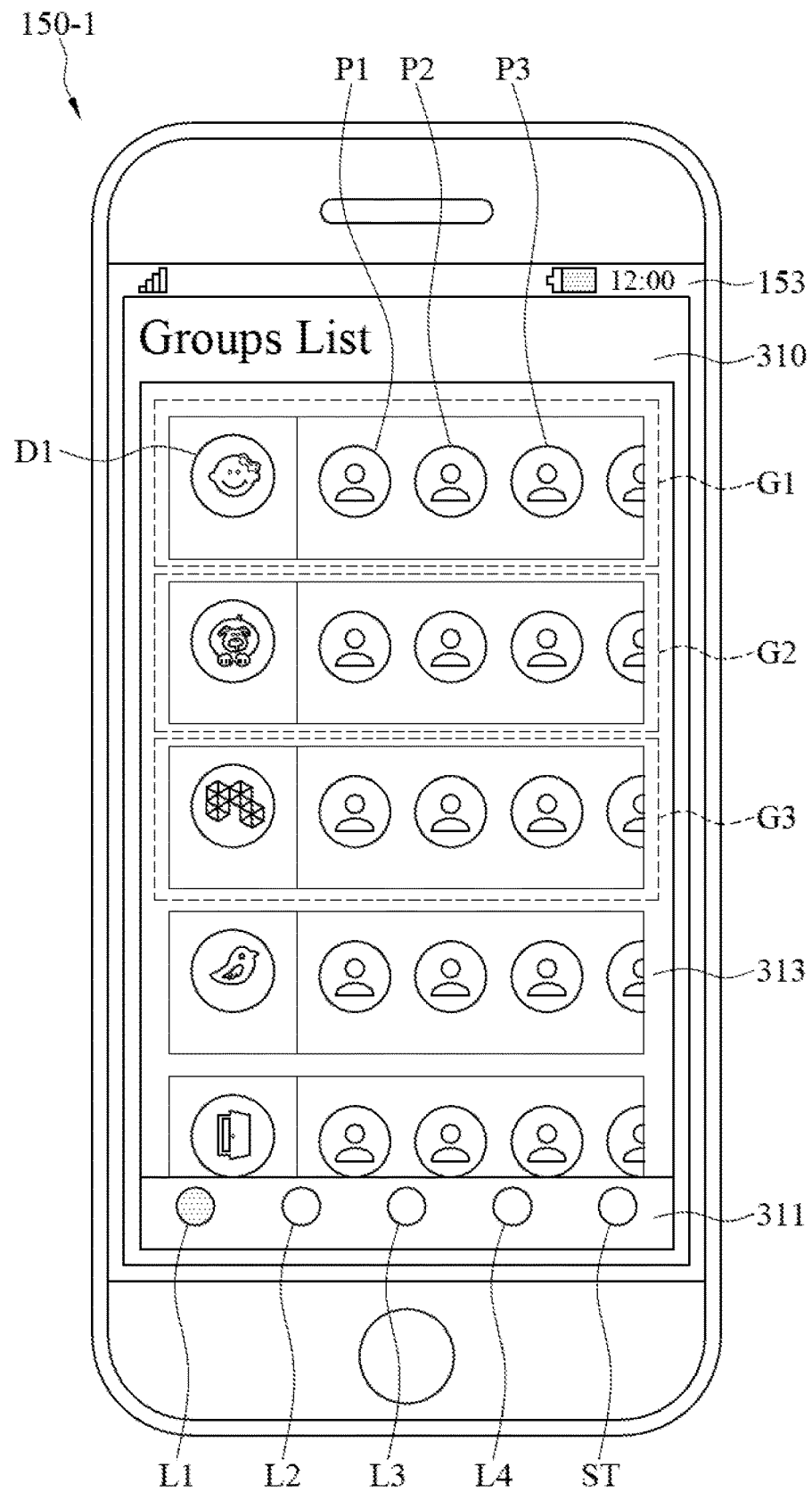
FIG. 4 is a schematic diagram of an embodiment of a user interface on the screen shown in FIG. 3.
Figure 5:
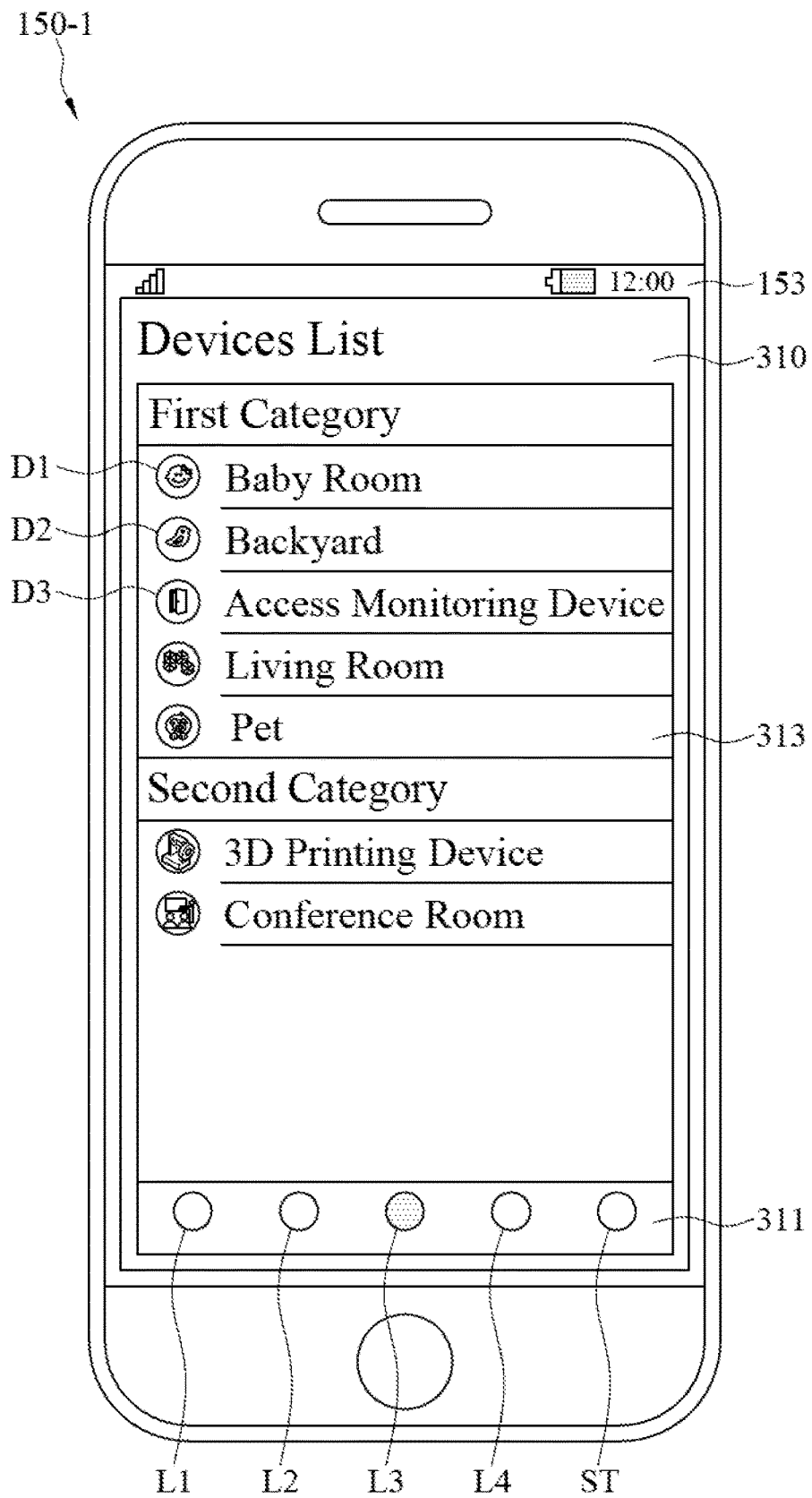
FIG. 5 is a schematic diagram of another embodiment of the user interface on the screen shown in FIG. 3.

Upon the completion of loading the contacts and the groups, a user interface 310, which is displayed on a screen 153 of the first user electronic device 150-1, has a browse option 311 and a browse window 313, as shown in FIGS. 4 to 5.

In some embodiments, the browse option 311 has a group list option L1, a chat room list option L2, a device list option L3, an individual list option L4, and a setup option ST.

The setup option ST is used to enable (trigger) the processing unit 151 of the first user electronic device 150-1 to produce and display one or more setup items on the browse window 313 for the user to accomplish basic setups for the association communication program by operating an input device (for example: a touch sensor, a physical button, or any combination thereof etc.) of the first user electronic device 150-1. In one embodiment, a setup item has a function of adding a new contact. When the function of adding a new contact is selected, the processing unit 151 of the first user electronic device 150-1 will enter a procedure of adding a new contact to provide an user interface (hereinafter referred to as an identification code capture interface 320) for inputting an identification code on the screen 153, as shown in FIG. 6.

Figure 6:
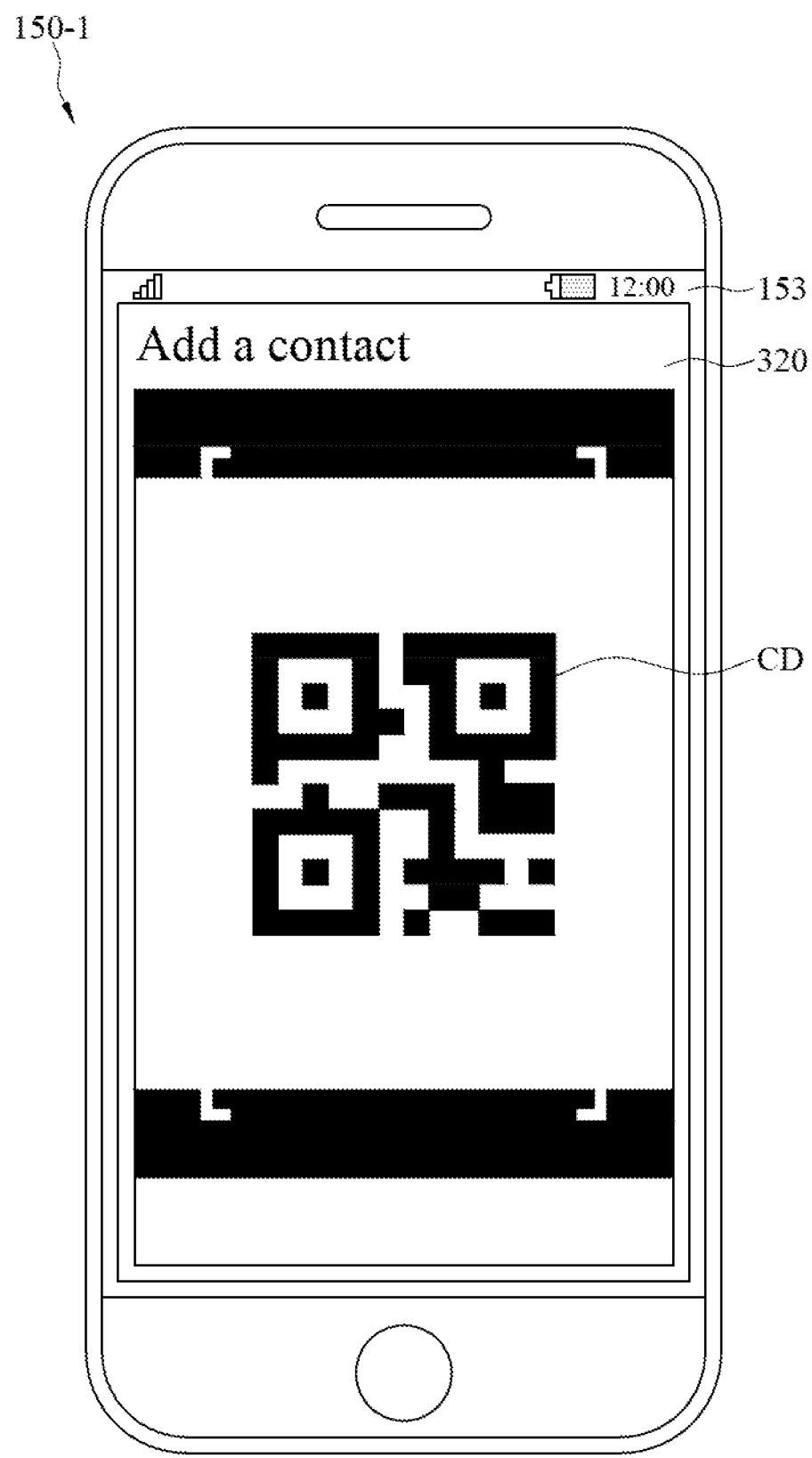
FIG. 6 is a schematic diagram of an embodiment of an identification code capture interface on the screen shown in FIG. 3.

In some embodiments, with reference to FIG. 6, the identification code capture interface 320 can have a scan function for a user to scan a barcode CD of an identification code (for example: another user account or mobile number, or a device identification code of a remote-controlled electronic device) by the first user electronic device 150-1. The processing unit 151 of the first user electronic device 150-1 decodes the barcode CD to obtain the information (identification code) carried by the barcode CD, thereby to add the obtained identification code to the contacts list of the first identification code. In some embodiments, when a new device (a device identity) is added as a contact by the user, the processing unit 151 of the first user electronic device 150-1 generates a device addition instruction having the obtained device identification code and transmits the device addition instruction to the server 110 via the network 20. Then, after the server 110 receives the device addition instruction, the server 110 will confirm whether the device identification code has been registered by another first identification code according to the device addition instruction. In other words, the storage unit of the server 110 has a device registration list. The device registration list includes at least one device identification code and a device administrator (i.e., the identification code which registers the device identification code) for each device identification code. Accordingly, the server 110 searches the device registration list for the device identification code in the device addition instruction to confirm whether this device identification code is in the device registration list. If the device identification code has not been registered (i.e., no such device identification code is found in the device registration list), the server 110 will add the device identification code to the device registration list, set the first identification code, representing the source of the device addition instruction to being a device administrator (i.e., to record the first identification code, which corresponds to the device identification code, in the device registration list), and return a permission-allowed packet to the first user electronic device 150-1. The first electronic device 150-1 will then add the device identification code (as a contact) to the contacts list of the first identification code, in response to the permission-allowed packet.

In one embodiment, when the device identification code has been registered (i.e., the device identification code is found in the device registration list), the server 110 returns a permission-denied packet to the first user electronic device 150-1. The processing unit 151 of the first user electronic device 150-1 provides an addition given-up option and a permission application option on the identification code capture interface 320 (on the screen 153) according to the permission-denied packet. The addition given-up option is for enabling (i.e., when selected) the processing unit 151 of the first user electronic device 150-1 to end the procedure of adding a new contact for this device identification code. The permission-application option is for enabling (i.e., when selected) the processing unit 151 of the first user electronic device 150-1 to generate a device permission application and transmit the generated device permission application to the server 110. The server 110 will then transmit the received device permission application to the device administrator of the device identification code to request the device administrator to confirm whether to give the first identification code the permission to use the remote-controlled electronic device 130 (i.e. the device identification code is added as a contact) of such device identification code. In another embodiment, when the device identification code has been registered (i.e., the device identification code is found in the device registration list), the server 110 can initiatively transmit a device permission application to the device administrator of the device identification code to request the device administrator confirm whether to give the first identification code the permission to use the remote-controlled electronic device 130 (i.e. the device identification code is added as a contact) of such device identification code. Furthermore, the server 110 will also return a waiting notification to the first user electronic device 150-1, which outputs the device addition instruction, to inform the user that the remote-controlled electronic device 130 has been registered and of the need to wait for the permission of the device administrator.

In some embodiments, the identification code capture interface 320 can have an input field for the user to input a to-be-added identification code into this input field (not shown) by operating the input device of the first user electronic device 150-1. The processing unit 151 of the first user electronic device 150-1 obtains the information (the identification code) from the input field via the input field, thereby to add the obtained identification code (as a contact) to the contacts list of the first identification code.

The group list option L1 is used to enable (trigger) the processing unit 151 of the first user electronic device 150-1 to produce and display a list of the established groups G1, G2, and G3 on the browse window 313, i.e. to display a first list interface having at least one of the groups G1, G2, and G3 on the screen 153, as shown in FIG. 4. Each group G1/G2/G3 includes a plurality of members (for example, the contacts which have joined the group G1). Further, at least one of the contacts of each group G1/G2/G3 is a device identity D1, and the rest are user identities P1/P2/P3. The device identity D1 represents the remote-controlled electronic device 130, assigned to this group G1. Each user identity P1/P2/P3 represents respectively the first user electronic device 150-1 and the second user electronic devices 150-2 and 150-3, assigned as the users in this group G1, respectively.

The chat room list option L2 is used to enable (trigger) the processing unit 151 of the first user electronic device 150-1 to produce and display a list of the established chat rooms on the browse window 313, i.e. to display a second list interface having at least one of the chat rooms on the screen 153 (not shown).

The device list option L3 is used to enable (trigger) the processing unit 151 of the first user electronic device 150-1 to produce and display a list of the device identities D1, D2, and D3 in all the contacts of the first identification code on the browse window 313, i.e. to display a third list interface having at least one of the device identities D1, D2, and D3 on the screen 153, as shown in FIG. 5. In some embodiments, the device identities D1, D2, and D3 in the list of the browse window 313 can be displayed, classified according to the properties (as the first category and the second category shown in FIG. 5), on the browser window 313.

The individual list option L4 is used to enable (trigger) the processing unit 151 of the first user electronic device 150-1 to produce and display a list of the user identities P1, P2, and P3 in all the contacts of the first identification code on the browse window 313, i.e. to display a third list interface having at least one of the user identities P1, P2, and P3 on the screen 153 (not shown).

Figure 7:
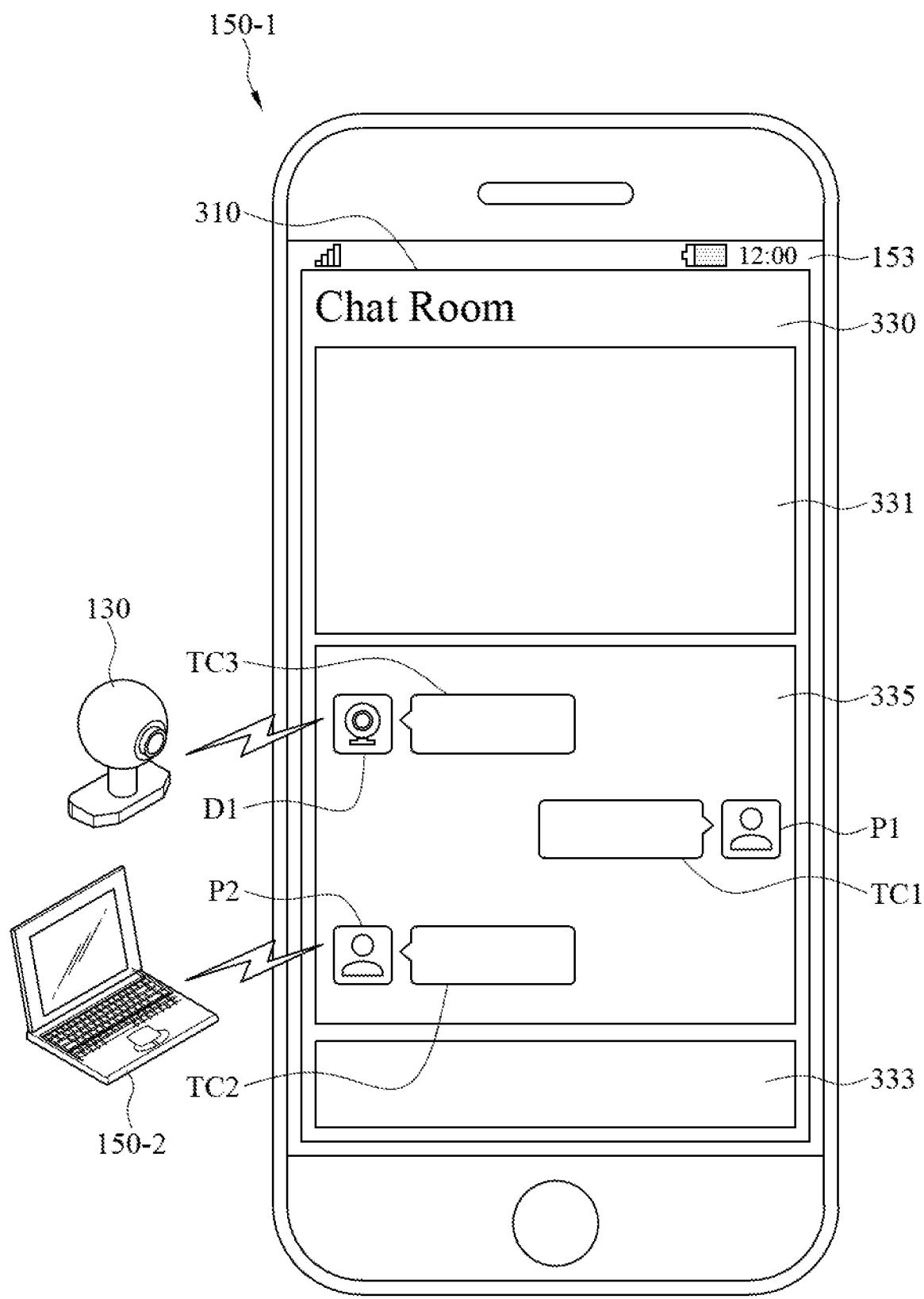
FIG. 7 is a schematic diagram of an embodiment of a chat room interface on the screen shown in FIG. 3.

For example, the members of the group G1 include the device identity D1, which represents the remote-controlled electronic device 130, the user identity P1, which represents the first user electronic device 150-1, and the user identities P2 and P3, which represent the second user electronic devices 150-2 and 150-3. When the user operates the first user electronic device 150-1 as the user identity P1 to execute a chat room procedure for the group G1 having the device identity D1, the processing unit 151 of the first user electronic device 150-1 selects the chat room of the group G1 from the options in the first list interface or from the options in the second list interface, thereby to enable (activate) the user interface 310 (hereinafter referred to as chat room interface 330, as shown in FIG. 7) to chat with all the members in the group G1, i.e. to control the screen 153 to display the chat room interface 330 for the group G1 for the user to interact with the remote-controlled electronic device 130 and the second user electronic devices 150-2 and 150-3 via the first user electronic device 150-1.

The chat room interface 330 includes a first window 331, a function bar 333 and a second window 335.

The first window 331 is to display operating information of the remote-controlled electronic device 130, represented by the device identity D1. In other words, when the chat room interface 330 for the remote-controlled electronic device 130 is opened (displayed on the screen 153), the processing unit 151 of the first user electronic device 150-1 connects and communicate with the remote-controlled electronic device 130 via the networking unit 157 to receive the operating information of the remote-controlled electronic device 130. Then, the processing unit 151 of the first user electronic device 150-1 controls the screen 153 to display the received operating information on the first window 331. In some embodiments, the remote-controlled electronic device 130 can relay and forward the operating information to the first user electronic device 150-1 (and the second user electronic device 150-2 and 150-3) via the server 110. In other embodiments, the remote-controlled electronic device 130 can send the operating information to the first user electronic device 150-1 (and the second user electronic device 150-2 and 150-3) in point-to-point connection.

The second window 335 is to display the chat contents TC1 and TC2, generated by all the user electronic devices (the first user electronic device 150-1 and the second user electronic devices 150-2 and 150-3). In some embodiments, the second window 335 is also to display the chat content TC3 from the remote-controlled electronic device 130.

The function bar 333 includes a chat function bar and a device instruction bar. In some embodiments, one of the chat function bar and the device instruction bar can be selected to be displayed on the chat room interface 330. In other embodiments, the chat function bar and the device instruction bar can both be displayed on the chat room interface 330 at the same time.

The chat function bar is provided for the user of the first user electronic device 150-1 as the user identity P1 to enter the chat content TC1 by operating the input device of the first user electronic device 150. In other words, when the chat room interface 330 for the remote-controlled electronic device 130 is opened (displayed on the screen 153), the processing unit 151 of the first user electronic device 150-1 connects and communicate with the second user electronic devices 150-2 and 150-3 for the user identities P2 and P3 via the networking unit 157 to transmit the chat content TC1 to the second user electronic devices 150-2 and 150-3 and receive the chat content TC2 of the second user electronic devices 150-2 and 150-3. In one embodiment, the processing unit 151 of the first user electronic device 150-1 displays the received chat content TC1 on the second window 335 and transmits the received chat content TC1 to the second user electronic devices 150-2 and 150-3 for the user identities P2 and P3 so that the chat content TC1 also appears/displays on the second window 335 of the second user electronic devices 150-2 and 150-3. In some embodiments, the processing unit 151 of the first user electronic device 150-1 relays and forwards the chat content TC1 to the second user electronic devices 150-2 and 150-3 via the server 110. In other embodiments, the processing unit 151 of the first user electronic device 150-1 can transmit the chat content TC1 to the second user electronic devices 150-2 and 150-3 in point-to-point connection.

Figure 8:
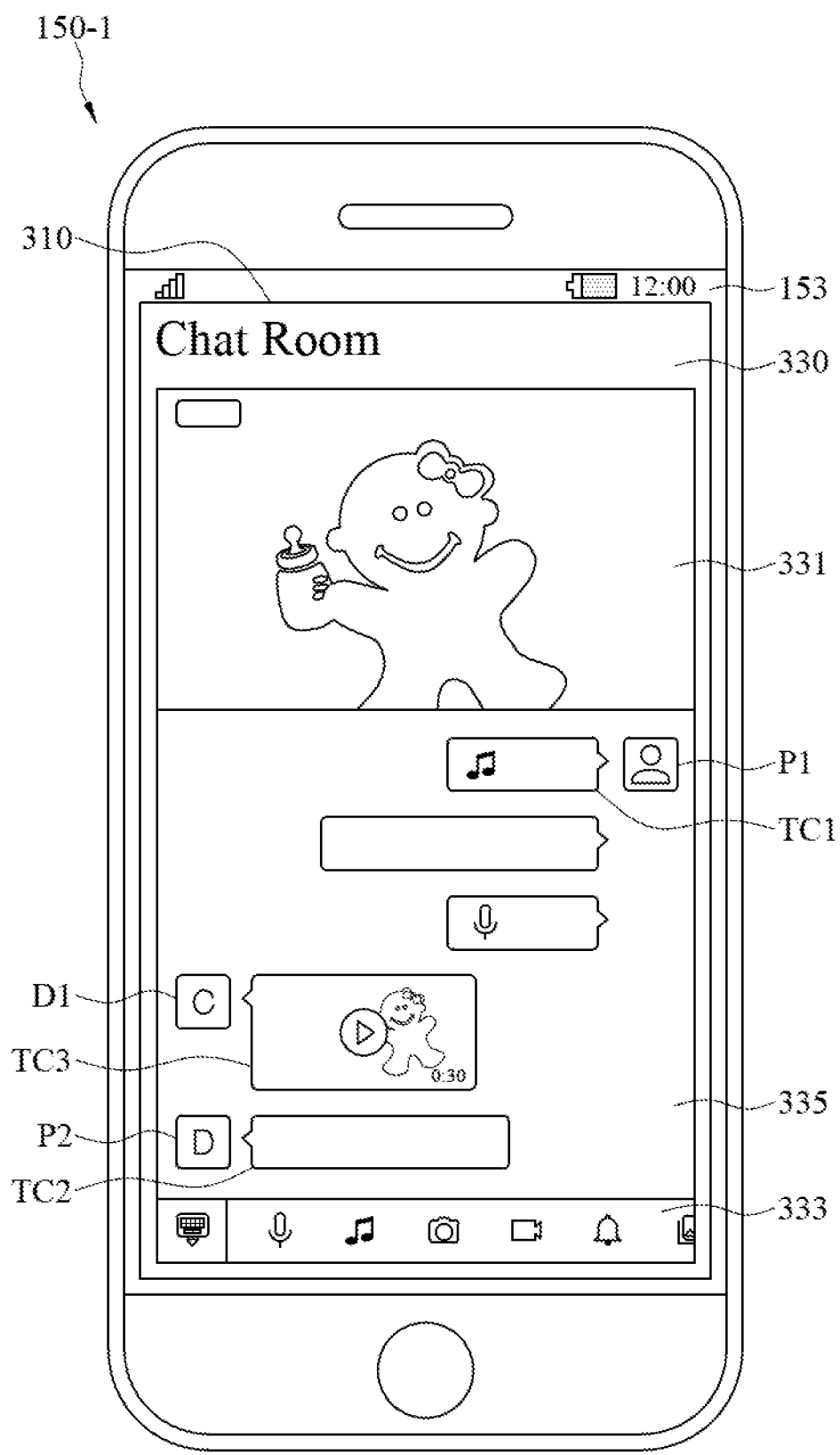
FIG. 8 is a schematic diagram of an example of the chat room interface shown in FIG. 7.

The device instruction bar of the function bar 333 provides with a control key set having one or more control keys, as shown in FIG. 8. This control key set is used for generating at least one control signal to control the remote-controlled electronic device 130. In other words, the processing unit 151 of the first user electronic device 150-1 generates a corresponding control signal according to one control key of the control key set corresponding to the remote-controlled electronic device 130 on the device instruction bar and transmits the generated control signal to the remote-controlled electronic device 130 via the network 20 to control the operation of the remote-controlled electronic device 130. In some embodiments, when the processing unit 151 of the first user electronic device 150-1 generates a control signal, the processing unit 151 of the first user electronic device 150-1 can also generate chat content TC1, which describes the control content of the control signal, display the generated chat content TC1 on the second window 335, and transmit the generated chat content TC1 to the other members (the second user electronic devices 150-2 and 150-3) to appear/be displayed on the second window 335 of the second user electronic devices 150-2 and 150-3 at the same time.

In some embodiments, the device instruction bar provides with a different set of control keys, depending on the types (attributes) of the controlled remote-controlled electronic device 130. For example, when the remote-controlled electronic device 130 is a webcam device, the control keys may include a power on/off key, a pause key and a record key. When the remote-controlled electronic device 130 is a baby monitoring device (with a camera and a music player), the control keys may include a power on/off key, a record-pause key, a record key, and a music play/stop key. When the remote-controlled electronic device 130 is a 3D printing device, the control keys may include a power on/off key, and a print-start key. When the remote-controlled electronic device 130 is an access monitoring device (having a door lock control unit, a camera, and a speaker), the control keys may include a record on/off key, a record-pause key, a record key, an unlock key, and a broadcast key.

In some embodiments, the storage unit 155 can store multiple sets of preset key settings. Each set of the preset settings can be used to control a set of control keys for one type (attributes) of the remote-controlled electronic device 130 on the device instruction bar. In other words, the multiple sets of preset key settings in the storage unit 155 correspond to the device identities (identification codes) of different types (attributes) of the remote-controlled electronic device 130, respectively. Herein, each set of control keys can be a combination of one or more keys.

For example, when the chat room interface 330 for the group G1 is opened, the processing unit 151 selects settings of a corresponding set of preset key from the multiple settings of sets of preset key according to the device identity in the group G1 and provides a set of control keys to control the device identity, representative of the remote-controlled electronic device 130, in the group G1 on the device instruction bar according to the selected setting of the set of preset key.

In some embodiments, in addition to the information of members, each group G1/G2/G3 further includes the control authority that the first identification code for the first user electronic device 150-1 has for the remote-controlled electronic device 130, represented by the group. In other words, each identification code in each group G1/G2/G3 has its own control authorities for the same remote-controlled electronic device 130 (the remote-controlled electronic device 130 is represented by the group G1/G2/G3), and the control authority of each identification code has is recorded in the respective group setting of its own. As such, for the same remote-controlled electronic device 130, all the identification codes in the same group G1/G2/G3 can have the same control authorities for all, have different control authorities from each other, or have the same control authority for some and have different control authorities for others. Therefore, when the chat room interface 330 is displayed, the processing unit 151 generates a set of control keys according to the device identity of the remote-controlled electronic device 130, and further controls at least one of a corresponding set of control keys, provided by the device instruction bar, for the remote-controlled electronic device 130 according to the control authority which the first identification code has. In some embodiments, all the control keys in this set of control keys are displayed on the device instruction bar; however, only some of the control keys, allowed by the control authorities, are enabled (i.e. can be triggered to generate a control signal) and the other control keys, disallowed by the control authorities, are disabled (i.e. cannot be triggered to generate a control signal). In other embodiments, under the control of the processing unit 151, only some of the control keys, allowed by the control authorities, are displayed on the device instruction bar, while the other control keys, disallowed by the control authorities, are not displayed.

In some embodiments, the remote-controlled electronic device 130 can also generate a chat content TC3 according to its operation, and transmit the chat content TC3 to the first user electronic device 150-1 and the second user electronic devices 150-2 and 150-3 to display in the second windows 335 of the first user electronic device 150-1 and the second user electronic devices 150-2 and 150-3.

For example, with reference to FIG. 8, when the remote-controlled electronic device 130 is a webcam device, operating information can be a live view of the webcam device, i.e. an image live streaming, generated by capturing environment images. Therefore, the processing unit 151 of the first user electronic device 150-1 displays the image live streaming from the remote-controlled electronic device 130 in the first window 331.

In some embodiments, the webcam device can have an event detection function. When the webcam device detects an event, the webcam device can automatically start an event recording and generate a video file. Once the video file is created, the webcam device will generate a chat content as a notification of receiving the video file, and output it to the user electronic device 150, represented by each user identity in the group having this webcam device. After the processing unit 151 of the user electronic device 150 receives the chat content as the notification of receiving the video file from the webcam device, the processing unit 151 of the user electronic device 150 displays the received chat content as the notification of receiving the video file in the second window 335 to notify the user of the user electronic device 150 of receiving the video file. Herein, the generated video file can first be stored in the storage unit of the webcam device or in the storage unit of the server 110 to wait for the user electronic device 150, represented by each user identity in the group having this webcam device, to execute the procedure of receiving the video file. Herein, the event can be a home security system being triggered, an alarm being triggered, a sensor being triggered, a door lock being unlocked, a moving object being detected or a combination thereof.

In another example, if the remote-controlled electronic device 130 is a process machine, operating information can be current status information of the process machine.

In some embodiments, a process machine may have an event detection function. When the process machine detects an event, the process machine can automatically capture all the status information from at present back to a preset period of time, the current status information, the status information at a time elapsed for a preset period of time since the event is detected, or any combination thereof, to generate an event data file. Once the event data file is generated, the process machine will generate a chat content as a notification of receiving an event data file, and output it to the user electronic device 150, represented by each user identity in the group having this process machine. After the processing unit 151 of the user electronic device 150 receives the chat content as the notification of receiving the event data file from the process machine, the processing unit 151 of the user electronic device 150 displays the received chat content as the notification of receiving the event data file in the second window 335 to notify the user of the user electronic device 150 of executing the procedure of receiving the event data file. Herein, the generated event data file can first be stored in the storage unit of the process machine or stored in the storage unit of the server 110 to wait for the user electronic device 150, represented by each user identity in the group having this process machine to execute the procedure of receiving the event data file. Herein, the event can be a fault occurrence, a threshold occurrence, or a combination thereof.

In another example, if the remote-controlled electronic device 130 is a 3D printing device, the operating information can be a printing progress of the 3D printing device. This printing progress can be displayed in the first window 331 in image or in text.

In some embodiments, the first window 331 and the second window 335 can be of the same type or different types of display windows. Herein, the type of the display windows can be scrollable or embedded etc.

In some embodiments, the chat content can be in text, symbol, image, video, audio or a combination thereof.

In some embodiments, the chat content can also be control content of the remote-controlled electronic device 130. When the chat function bar is to input a chat content (in text or audio), the processing unit 151 can analyze the chat content (by keyword scanning or/and voice recognition), to determine whether it is control content of the remote-controlled electronic device 130. If it is confirmed as the control content of the remote-controlled electronic device 130, the processing unit 151 generates a corresponding control signal based on the control content and sends it to the remote-controlled electronic device 130 to control its operation.

In some embodiments, the contacts list includes a plurality of contacts. Each contact (its information) includes a user identity. In some case, the contact can further include an account name. If the contact includes an account name, the contact will be displayed by the account name in the user interface 310 on the screen 153. If there is no account name in the contact, the contact will be displayed by all or some of its user identities in the user interface 310 on the screen 153. In some embodiments, when the contact is a user identity, an account name can be defined by the user. When the contact is a device identity, an account name can be defined by the device administrator.

In some embodiments, the remote-controlled electronic device 130 and the user electronic device 150 can be any electronic device capable of networking. The user electronic device 150 represents a device, which initiates a request for point-to-point connection, for example, a personal computer (PC), a smartphone, a personal navigation device (PND), a notebook computer, a tablet computer, or a smart appliance. The remote-controlled electronic device 130 represents an electronic device, which receives a request for point-to-point connection, for example, a video camera, an IP cam device or a smart appliance, and other devices. The server 110 may be a point-to-point server. Each of the connection information includes location information, such as an Internet Protocol Address (IP Address) and a Port Address.

In some embodiments, the aforementioned point-to-point connection can be replaced by the peer to peer connection.

In some embodiments, the processing unit can be implemented with one or more processing elements. The processing element can be a microprocessor, a microcontroller, a digital signal processor, a microcomputer, a central processing unit, a field-programmable gate array, a programmable logic device, a state machine, a logic circuit, an analog circuit, a digital circuit, and/or any device which operates signals (analog and/or digital) based on operation instructions. Each of the storage units can be implemented with one or more storage elements. As such, the storage element can be, for example, a memory or a register, etc., but it is not limited thereto. The memory can be, for example, a read-only memory (ROM), a random access memory (RAM), a volatile memory, a non-volatile memory, a static memory, a dynamic memory, a flash memory and/or any device that stores digital information. The networking unit can be a wired network link module, a wireless network link module, a wireless communication module, or any combination thereof.

As above, the user electronic device, the user interface, and the computer program product of any embodiment can provide a chat room interface for real-time interaction among multiple users and device.

While the instant disclosure has been disclosed by the aforementioned preferred embodiments, it is not intended to limit the instant disclosure. For anyone skilled in the art, various modifications and variations can be made without departing from the spirit and the scope of the instant disclosure. Therefore, the covered scope of the instant disclosure is based on the appended claims.

What is claimed is:

1. A user electronic device, comprising:
   a storage unit, storing a plurality of contacts, wherein the contacts comprise at least one device identity and a plurality of user identities, wherein each of the at least one device identity is registered in a server by an unique identification code (UID) of a remote-controlled electronic device represented by the device identity, and each of the plurality of user identities is registered in the server by an user account or a mobile number;
   a processing unit, coupled to the storage unit, executing a chat program to generate a chat room interface of a group where one particular device identity of the at least one device identity and at least one particular user identity of the plurality of user identities are assigned;
   a networking unit, coupled to the processing unit, connected to a particular remote-controlled electronic device represented by the particular device identity and at least one particular other user electronic devices each logged in to the server as the at least one particular user identity, wherein the particular remote-controlled electronic device belongs to the particular device identity of the group, the at least one other user electronic devices respectively belongs to the at least one particular user identity of the group, and the particular remote-controlled electronic device represented by the particular device identity of the group and the at least one particular other user electronic device represented by the at least one particular user identity of the group chat and interact with each other via the chat room interface; and
   a screen, coupled to the processing unit, displaying the chat room interface, wherein the chat room interface includes a first window, a function bar, and a second window; the first window displays operating information of an auto-operation of the particular remote-controlled electronic device represented by the particular device identity of the group, the second window displays at least one chat content, the function bar includes a chat function bar for inputting the chat content and a device instruction bar for providing a control key set corresponding to the particular device identity of the group, the chat function bar and the device instruction bar are in the same window, and each control key in the control key set are used for generating at least one control signal to control the particular remote-controlled electronic device;
   wherein the at least one chat content induced by the user electronic device, the particular remote-controlled electronic device represented by the particular device identity of the group interacting with the user electronic device, and the at least one particular other user electronic device represented by the at least one particular user identity of the group interacting with the user electronic device; and
   wherein the processing unit generates and displays the at least one chat content on the second window, and the at least one chat content includes a chat content describing the control content of the control signal and another chat content which is generated by the particular remote-controlled electronic device as a notification for showing a result of the auto-operation of the particular remote-controlled electronic device;
   wherein a connection between the networking unit and each of the at least one particular other user electronic devices is point-to-point connection or peer-to-peer connection, and another connection between the networking unit and the particular remote-controlled electronic device is point-to-point connection or peer-to-peer connection;
   wherein the particular remote-controlled electronic device is a device type comprising a webcam device, a process machine, a 3D printing device or a smart appliance; and wherein the storage unit further stores a plurality of sets of preset key settings respectively corresponding to the device identities representing one of the device types of the remote-controlled electronic devices, and the processing unit selects a corresponding set of preset key setting from the plurality of sets of preset key settings according to the device identity of the group and provides the control key set in the device instruction bar according to the selected set of preset key setting.

2. The user electronic device according to claim 1, wherein the particular remote-controlled electronic device is the webcam device, the operating information is an image live streaming, and the processing unit receives the image live streaming from the webcam device via the networking unit and controls the screen to display the received image live streaming in the first window.

3. The user electronic device according to claim 2, wherein the webcam device further starts an event recording when detecting an event to produce a video file and generates the chat content as a notification of receiving the video file in the second window.

4. The user electronic device according to claim 1, wherein the particular remote-controlled electronic device is the process machine, which captures status data when detecting an event to form an event data file and generates the chat content as a notification of receiving the event data file, and the processing unit receives the chat content as the notification of receiving the event data file from the process machine via the networking unit and controls the screen to display the chat content as the notification of receiving the event data file in the second window.

5. A first user electronic device, having a screen, and the screen displaying a user interface for providing the first user electronic device with a capability of interacting with any of at least one group as a first user identity and generating and displaying at least one chat content, each of the at least one group including a device identity and at least one second user identity, the user interface comprising:
   a chat room interface, generated by executing a chat program, the chat room interface comprising:
   a first window, displaying operating information of a remote-controlled electronic device represented by the device identity of the group interacting with the first user elctronic device, wherein the device identity is registered in a server by an unique identification code (UID) of the remote-controlled electronic device, and each of the first user identity and the at least one second user identity is registered in the server by an user account or a mobile number;
   a second window, displaying the at least one chat content, wherein each of the at least one chat content being from one of the first user electronic device, the remote-controlled electronic device represented by the device identity of the group interacting with the first user electronic device and at least one second user electronic device represented by the at least one second user identity of the group interacting with the first user elctronic device, and wherein the at least one chat content includes a chat content describing a control content of a control signal and another chat content which is generated by the remote-controlled electronic device as a notification for showing the operating information of an auto-operation of the remote-controlled electronic device;
   a function bar, comprising:
   a chat function bar, generating the chat content of the first user electronic device; and
   a device instruction bar, providing a control key set corresponding to the device identity of the group interacting with the first user electronic device, the control key set generating at least the control signal to control the remote-controlled electronic device represented by the device identity of the group interacting with the first user electronic device, wherein the chat function bar and the device instruction bar are in the same window;
   wherein the first user electronic device represented by the first user identity, the remote-controlled electronic device represented by the device identity and the at least one second user electronic device represented by the at least one second user identity chat and interact with each other via the chat room interface;
   wherein a connection between the first user electronic device and each of the at least one second user electronic device is point-to-point connection or peer-to-peer connection;
   wherein the particular remote-controlled electronic device is a device type comprising a webcam device, a process machine, a 3D printing device or a smart appliance; and
   wherein the first user electronic device further stores a plurality of sets of preset key settings respectively corresponding to the device identities representing one of the device types of the remote-controlled electronic devices, and selects a corresponding set of preset key setting from the plurality of sets of preset key settings according to the device identity of the group and provides the control key set in the device instruction bar according to the selected set of preset key setting.

6. The first user electronic device according to claim 5, wherein one of the control key sets is the control key set, one of different device identities is the device identity, and one of the different device types of remote-controlled elctronic devices is the remote-controlled electronic device.

7. The first user electronic device according to claim 5, wherein the device instruction bar further provides the control key set according to a control authority of the first user identity.

8. The first user electronic device according to claim 5, wherein the remote-controlled electronic device is the webcam device and the operating information is an image live streaming.

9. The first user electronic device according to claim 8, wherein the webcam device further starts an event recording when detecting an event to produce a video file and generate the chat content as a notification of receiving the video file, and the second window displays the chat content as the notification of receiving the video file from the webcam device, received by the first user electronic device.

10. The first user electronic device according to claim 5, wherein the remote-controlled electronic device is the process machine, which captures status data when detecting an event to form an event data file and generate the chat content as a notification of receiving the event data file, and the second window displays the chat content as the notification of receiving the event data file from the process machine after the first user electronic device receives the chat content as the notification of receiving the event data file.

11. A non-transitory computer readable medium, comprising a plurality of computer program instructions stored in the non-transitory computer readable medium, wherein the plurality of computer program instructions are loaded and executed by a first user electronic device to cause the first user electronic device to implement the user interface according to claim 5.

* * * * *